United States Patent
Dougherty

[15] 3,703,829
[45] Nov. 28, 1972

[54] LIQUID QUANTITY GAGING SYSTEM
[72] Inventor: William R. Dougherty, St. Anthony Village, Minn.
[73] Assignee: Honeywell Inc., Minneapolis, Minn.
[22] Filed: April 19, 1971
[21] Appl. No.: 135,096

[52] U.S. Cl. ..............................73/290 R, 73/304 R
[51] Int. Cl................................................G01f 23/28
[58] Field of Search .........................73/290 R, 304 R

[56] References Cited

UNITED STATES PATENTS

| | | | |
|---|---|---|---|
| 3,296,862 | 1/1967 | Ziniuk | 73/290 R |
| 3,424,002 | 1/1969 | Johnson | 73/290 R |
| 3,603,899 | 9/1971 | Gyorgy | 333/31 X |

Primary Examiner—Louis J. Capozi
Assistant Examiner—Frederick Shoon
Attorney—Charles J. Ungemach et al.

[57] ABSTRACT

Pulses are applied to the upper end of an electrical transmission line sensor mounted in a fluid container or tank. Each pulse is reflected at the surface of the fluid, because of the change in dielectric constant which changes the characteristic impedance of the transmission line, and again at the lower end of the transmission line which is not terminated in its characteristic impedance. The volume of fluid in the tank is a function of time delay, $t1$, associated with the surface-reflected pulse. The density of the fluid is a function of time delay $t1$ and another time delay, $t2-t1$, associated with the pulse reflected from the lower end of the transmission line and with respect to the surface-reflected pulse. The weight of fluid in the tank is the product of the volume and density functions.

10 Claims, 6 Drawing Figures

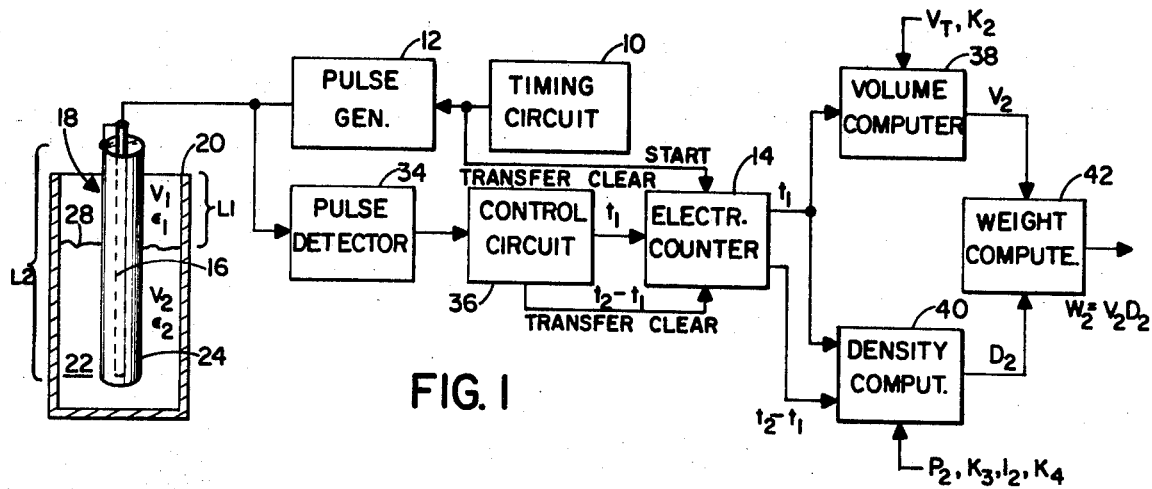
FIG. 1
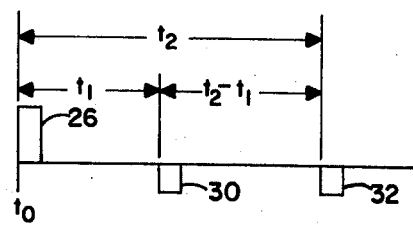
FIG. 2
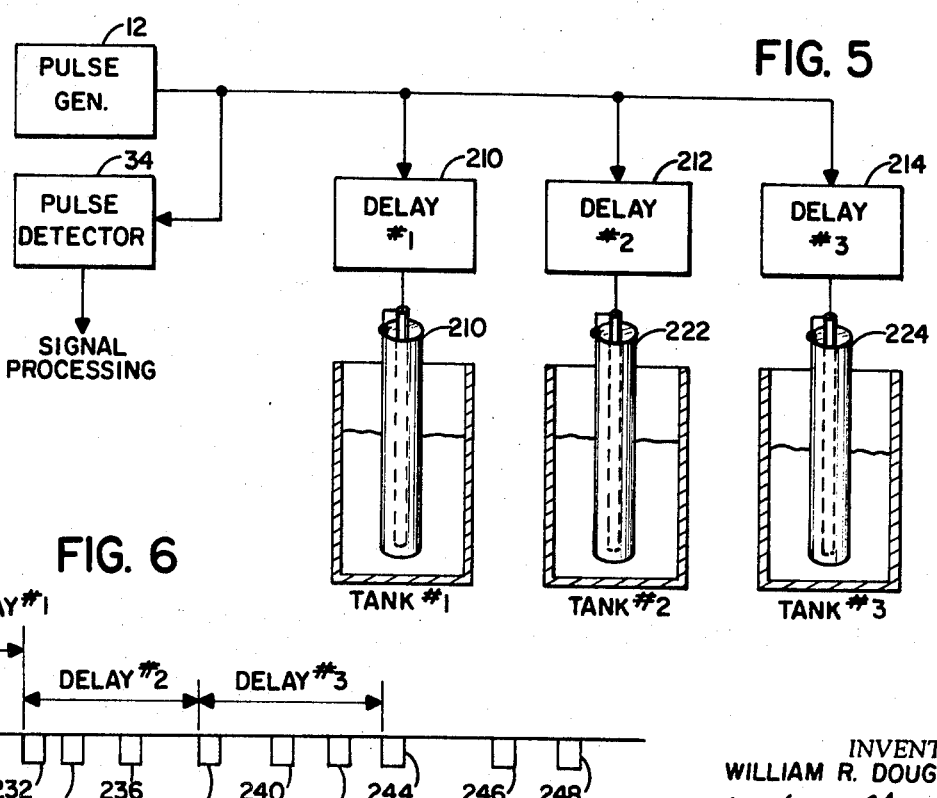
FIG. 5
FIG. 6
INVENTOR.
WILLIAM R. DOUGHERTY
BY Charles J. Ungemach
ATTORNEY

INVENTOR.
WILLIAM R. DOUGHERTY

BY Charles J. Ungemach

ATTORNEY

LIQUID QUANTITY GAGING SYSTEM

BACKGROUND

The invention relates to the field of measuring the weight of fluid in a tank and involves a determination of fluid volume, which is a function of liquid level, and a determination of fluid density. Weight is the product of volume and density.

In prior art gages of the same general type known to the applicant, density is not determined, which means that the prior art gages are volume gages and not weight (or mass) gages. The weight of a fluid in a tank is often more significant than its volume; this is true, for example, with aircraft operation. Specific prior art U. S. Pat. Nos. are 3,296,862 and 3,424,002. A prior art article is "A New Instrument for the Measurement of Liquid Level," by K. Lindstrom, et al., The Review of Scientific Instruments, July 1970, pages 1,083–1,087.

SUMMARY

The invention is apparatus for determing the weight of fluid in a tank and comprises an electrical transmission line of known length, acting as a sensor, vertically mounted in the tank. Electrical signal pulses are generated and applied to the upper end of the transmission line, travel down the line and are reflected at the fluid surface and at the lower end of the line, which is not terminated in its characteristic impedance. The volume of fluid in the tank is a function of the fluid level which in turn is a function of the time delay between the application of a pulse and the receipt of a surface-reflected pulse. An electronic counter used to measure this first time delay. The density of the fluid in the tank is a function of the dielectric constant of the fluid which in turn is a function of the first time delay and a second time delay between the receipt of a surface reflected pulse and the receipt of a pulse reflected from the lower end of the transmission line. This second time delay may also be measured by an electrical counter. Weight, the product of volume and density, is then computed from the volume and density functions.

In many situations the weight of fluid is more significant than the volume. This is usually true when the fluid being measured is a fuel, e.g., jet aircraft fuel, because weight is a better measure of energy. This is one advantage of the invention, another is that the measured density is an average density representing the density of a relatively large vertical sample of fluid in the tank even though the fluid density may vary from the surface to the bottom of the tank. This improves the accuracy of the gage.

BRIEF DESCRIPTION OF THE DRAWINGS

FIG. 1 is a block diagram of apparatus for measuring the weight of fluid in a tank;

FIG. 2 is a diagram showing the time relationship between a pulse applied to the top of the transmission line probe and the associated pulses reflected at the fluid surface and the lower end of the transmission line, respectively;

FIG. 5 is a block diagram of a multi-probe system; and,

FIG. 6 is a diagram illustrating the time relationship of signal pulses in the system of FIG. 5.

DESCRIPTION OF THE PREFERRED EMBODIMENTS

Figure 3:
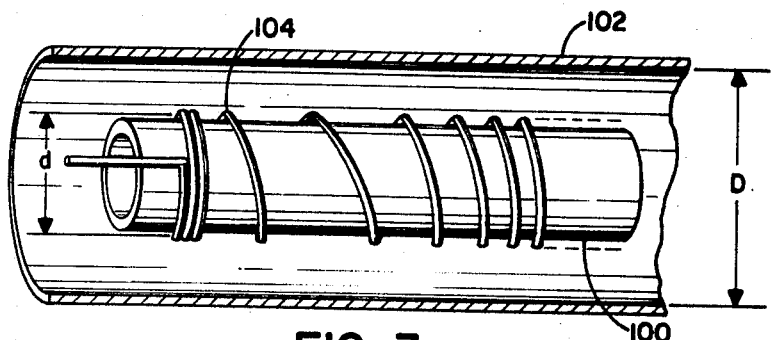
FIG. 3 is a wire wound transmission line sensor with characterized inductance which is achieved by varying the pitch of the wire winding.

In FIG. 1 signals from a timing circuit 10 energize a pulse generator 12 and start an electronic counter 14, which includes a source of high frequency pulses functioning as a clock. Pulses from generator 12 are applied to the central conductor 16 of a coaxial transmission line sensor 18 mounted in a tank 20 containing a fluid 22. The transmission line sensor 18 need not necessarily be coaxial. Line 18 has a concentric outer conductor 24. Each of the pulses applied to line 18 are represented by pulse 26, occurring at time t0, in FIG. 2. A pulse applied to the top of line 18 propagates down line 18 until the surface 28 of fluid 22 is reached. At this point the pulse is partially reflected. The unreflected portion of the pulse continues downward and is eventually reflected at the lower end of line 18, which is not terminated in its characteristic impedance. In FIG. 2 the two reflected pulses associated with each applied pulse 26 are represented by pulse 30, occurring at time t1, and pulse 32, occuring at time t2. The reflected pulses are detected by a pulse detector 34 and are then used to energize a control circuit 36 which develops signals for controlling the electronic counter 14, e.g., signals which cause the contents of counter 14 to be transferred to computers in the system and signals which cause counter 14 to be cleared. Counter 14 develops two digital output signals: one proportional to the time t1 and the other proportional to the time (t2–t1). Upon receipt of a surface-reflected pulse, such as pulse 30, by control circuit 36, the count in counter 14, proportional to t1, is transferred to a volume computer 38 and counter 14 is cleared. The digital signal corresponding to time t1 is also transferred to a density computer 40. Upon receipt of a pulse reflected from the end of the transmission line, such as pulse 32, by control circuit 36, the digital signal developed by electronic counter 14, corresponding to the time (t2–t1) is transferred to the density computer 14 and counter 14 is cleared. The cycle is continually repeated. The volume of fluid in the tank is a function of time t1 and is computed by computer 38 which also utilizes some constants. The density of the fluid in the tank is a function of time t1 and time (t2–t1) and is computed by computer 40 which also utilizes some constants. The computed volume and density signals are transmitted to a weight (or mass) computer 42 which, in effect, computes the product of the volume and density signals.

The invention is based on a theory of operation which can be expressed mathematically. The volume of fluid $V_2$, in a tank can be expressed as $$V_2 = V_T - V_1 \qquad (1)$$

where $V_T$ is the total tank volume, which is known, and $V_1$ is the volume of that part of the tank which is unoccupied by the fluid (sometimes called the ullage). This invention is not limited to use with a uniform tank, but in a uniform tank the volume $V_1$ is directly proportional to the length $L_1$, which is the distance from the top of the transmission line to the surface of the fluid. Therefore $$V_2 = V_T - K_1 L_1 \quad (2)$$

The length $L_1$ can be expressed in terms of time $t_1$ since $t_1$ varies directly as $L_1 \sqrt{e_1}/C$, where $e_1$ is the dielectric constant of the medium occupying $V_1$ and C is the velocity of light. Since this medium is air or air and fuel vapor, its dielectric constant is very close to 1.0. Therefore $$V_2 = V_T - K_2 t_1 \quad (3)$$

or, more generally, where the tank may be non-uniform or tilted or both, $$V_2 = V_T - f(t_1) \quad (4)$$

where $f(t_1)$ is a function of $t_1$.

The theory of operation up to this point has probably been used before in volumetric gaging systems. Continuing, however, the weight, $W_2$, of the fluid in volume $V_2$ is $$W_2 = V_2 D_2 \quad (5)$$

where $D_2$ is the density of the fluid. $V_2$ is determined from equation (3) or (4). To determine $D_2$, use is made of the Clausius-Mossotti relation $$D_2 = P_2(e_2-1)/(e_2+2) \quad (6)$$

where $P_2$ is a polarization constant associated with the fluid and $e_2$ is the dielectric constant of the fluid. The dielectric constant can be expressed in terms of time since $(t_2 - t_1)$ varies as $\sqrt{e_2}(L_2 - L_1)/C$, where $L_2$ is the total length of the transmission line, which is known. Therefore it can be shown that $$e_2 = K_3 [(t_2 - t_1)/(L_2 - L_1)]^2 \quad (7)$$

From the previous derivation of equation (3) it is known that $L_1$ can be expressed in terms of t1 so that $$e_2 = K_3[(t_2 - t_1)/(L_2 - K_4 t_1)]^2 \quad (8)$$

Substituting equation (8) into equation (6) gives $$D_2 = P_2 \left[ \frac{K_3 \left( \frac{t_2 - t_1}{L_2 - K_4 t_1} \right)^2 - 1}{K_3 \left( \frac{t_2 - t_1}{L_2 - K_4 t_1} \right)^2 + 2} \right] \quad (9)$$

The product of equation (3) or (4) and equation (9) gives $W_2$, the desired quantity. It is apparent that $W_2$ is a function of only the variables $(t_2 - t_1)$ and $t_1$, the quantities which are determined by the apparatus of the invention.

A characterized transmission line sensor is shown in FIG. 3. The sensor has an inner cylindrical coil form 100 and a concentric outer cylindrical conductor 102. A helical or spiral inner wire or conductor 104 is wound on form 100. The transmission velocity along the line varies in accordance with the equation $$v = (LC)^{-} \quad (10)$$

where L and C are the inductance and capacitance along the line. In the line of FIG. 3 the capacitance per foot of axial length is given by $$C' = 7.4 \, K/\log_{10} D/d \quad (11)$$

where K is the dielectric constant of the medium between inner conductor 104 and outer conductor 102, D is the inside diameter of the outer conductor 102 and d is the mean diameter of the helix or spiral formed by inner conductor 104. The inductance per foot of axial length is given by $$L' = 0.30 \, n^2 d^2 \, [1 - (d/D)^2] \quad (12)$$

where $n$ is the number of turns per axial inch of the helical inner conductor 104. It is apparent from equations (12) and (10) that v may be made to vary inversely as n. When the volume of a non-uniform tank is being measured it is sometimes convenient to characterize the transmission line sensor such that v along the transmission line varies inversely as the volume rate of change along the transmission line. Thus when the pulse is propagating along an increment of the transmission line associated with a relatively large increment of volume the velocity is relatively slow and the time delay is relatively large, and vice-versa. This can be accomplished by winding inner conductor 104 such that n varies with the rate of change of volume along the transmission line.

The coil form 100 and conductor 104 of FIG. 3 can be fabricated in a number of ways wherein instead of using a wire-wound conductor the conductor is "printed" on the form. For example, a conductive pattern may be silk-screened directly on the form. Or, the form can be completely coated with a conductive material which is cut, etched, or otherwise mechanically or chemically removed to leave the desired pattern. Or, a resist material can be applied to those areas of the form which are not to be conductive, and then a conductive material can be applied by dipping, spraying, silk-screening, or plating the form, the conductive material adhering to the form only in those areas which are not covered by resist material.

Figure 4:
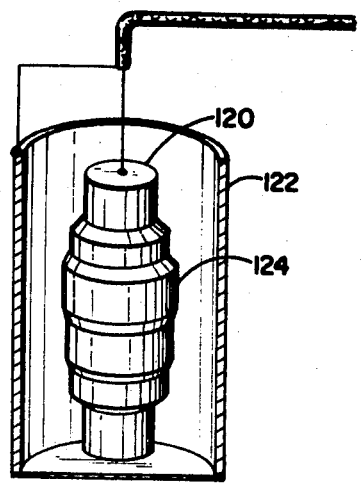
FIG. 4 is a transmission line sensor with characterized capacitance, inductance, or both.

Another characterized transmission line sensor is shown in FIG. 4. The sensor comprises a central conductor 120, a concentric outer conductor 122, and a sleeve 124 of dielectric material mounted on conductor 120. The transmission velocity along a transmission line is a function of the inductance and capacitance of the line as expressed by equation 10. Whereas only the inductance of the sensor of FIG. 3 is characterized, the capacitance, inductance, or both, of the sensor of FIG. 4 is characterized. In characterization, the transmission velocity along an increment of the line is made proportional to the corresponding cross-sectional increment of the tank (or some other function of tank geometry). Characterization is seen as a conversion from length, i.e., height, to volume and if the conversion doesn't occur in the sensor it can take place somewhere else in the system, e.g., in the volume computer 38 of FIG. 1.

The velocity of the line of FIG. 4 is varied by altering the permittivity, and hence the dielectric constant and the capacitance, of the space between conductors 120 and 122 by introducing sleeve 124. The velocity along the line varies inversely as the thickness of the sleeve. The permittivity of a section of the line can also be varied by the choice of material for sleeve 124 so that the material or the thickness or both may be varied.

The velocity of the line can also be varied with the use of a sleeve 124 of ferromagnetic material so that the permeability, and hence the inductance, of the space between conductors 120 and 122 is affected. The particular ferromagnetic material selected and the thickness will determine the velocity along the line.

In many instances fluid quantity gaging systems of the type disclosed using transmission line pulse reflectometry can be simplified and made more economical if a number of sensors or probes can be connected to a common electronic signal processing system. To do this it is necessary to determine which sensor a reflected pulse is associated with. In the system of FIG. 5 this is accomplished by connecting a fixed delay unit 210, 212, and 214 in series with each sensor 210, 222 and 224, respectively, such that the longest time interval between a transmitted pulse and a reflected pulse for any one sensor is less than the built-in time delay between sensors. In effect a block of time is assigned to each sensor. Although the time delays would usually be provided by specific delay circuits such as units 210, 212, and 214 they could also be provided by the interconnecting cables, which can be though of as transmission lines, taking into account the transmission line velocity and the length of the cable runs. Note also that the delay unit 210 is not strictly necessary.

The timing diagram of FIG. 6 clarifies the concept. An initial pulse 230 from generator 12 is applied to each of the delay units 210, 212, and 214. The delay associated with unit 210 is the smallest and that associated with unit 214 is the largest. After the time delay associated with delay unit 210, called Delay No. 1, a base line pulse 232 is received by pulse detector 34. The base line pulse is a reflected pulse and arises because of a deliberate mismatch between the interconnecting cables and each sensor. The base line pulses serve as time reference points and eliminate the necessity of precise and highly stable delay units. After receiving base line pulse 232, reflected pulses 234 and 236 associated with sensor 220 are received. Pulse 234 is the surface reflected pulse and pulse 236 is reflected from the end of transmission line sensor 220. After the time delay associated with delay unit 212, called Delay No. 2, a second base line pulse 238 and two reflected pulses 240 and 242 from sensor 222 are received by detector 34. After the time delay associated with delay unit 214, called Delay No. 3, a third base line pulse 244 and two reflected pulses 246 and 248 are received by detector 34. The time $t_1$ in each case is the time between a base line pulse and the first of the associated reflected pulses; the time $t_2 - t_1$ in each case is the time between associated surface-reflected and end-of-the-line pulses.

Various modifications can be made to the invention as shown by those skilled in the art.

I claim:

1. Apparatus for measuring the weight of fluid in a tank, comprising:
   an electrical transmission line of predetermined length adapted to be mounted in the tank and open to the fluid;
   means for applying electrical pulses to one end of the line, an applied pulse being reflected at the surface of the fluid and at the other end of the line;
   means for measuring the time between an applied pulse and the corresponding surface-reflected pulse and the time between the surface-reflected pulse and the corresponding end-of-the-line-reflected pulse;
   means responsive to the two measured times for computing each of the volume, density, and mass of the fluid, the volume of the fluid being a function of the first time, the density of the fluid being a function of both the first and second times, and the mass of the fluid being a function of the volume and density.

2. An open electrical transmission line for use in measuring the quantity of fluid in a tank, comprising:
   a helical conductor with the number of turns per unit length varying in accordance with a characteristic of the tank in which the transmission line is to be used;
   a cylindrical conductor; and,
   means for mounting the helical conductor concentrically within the cylindrical conductor.

3. An open electrical transmission line for use in measuring the quantity of fluid in a tank, comprising:
   a cylindrical outer conductor;
   a center conductor mounted concentrically within the outer conductor;
   a sleeve of dielectric material mounted coaxially with the conductors, the sleeve having a dielectric constant which varies along the length of the sensor in accordance with a characteristic of the tank in which the transmission line is to be used.

4. An open electrical transmission line for use in measuring the quantity of fluid in a tank, comprising:
   a cylindrical outer conductor;
   a center conductor mounted concentrically within the outer conductor;
   a sleeve of ferromagnetic material mounted coaxially with the conductors, the sleeve having a thickness and permeability which varies along the length of the sensor in accordance with a characteristic of the tank in which the transmission line is to be used.

5. An open electrical transmission line for use in measuring the quantity of fluid in a tank, comprising:
   a cylindrical outer conductor;
   a center conductor mounted concentrically within the outer conductor;
   a sleeve of ferromagnetic material mounted coaxially with the conductors, the sleeve having a permeability which varies along the length of the sensor in accordance with a characteristic of the tank in which the transmission line is to be used.

6. An open electrical transmission line for use in measuring the quantity of fluid in a tank, comprising:
   a cylindrical outer conductor;
   a center conductor mounted concentrically within the outer conductor;
   a sleeve of dielectric and ferromagnetic material mounted coaxially with the conductors, the sleeve having a thickness and electrical properties which varies along the length of the sensor in accordance with a characteristic of the tank in which the transmission line is to be used.

7. An open electrical transmission line for use in measuring the quantity of fluid in a tank, comprising:
   a cylindrical outer conductor;
   a center conductor mounted concentrically within the outer conductor;
   a sleeve of dielectric and ferromagnetic material mounted coaxially with the conductors, the sleeve having an electrical property which varies along the length of the sensor in accordance with a characteristic of the tank in which the transmission line is to be used.

8. A pulse reflectometry fluid quantity gaging system, comprising:
- a plurality of transmission line sensors;
- a single means for generating electrical pulses;
- a separate delay means to provide time separation of the outputs from each of said probes and connecting each sensor to the means for generating electrical pulses;
- means for detecting the pulses reflected from the sensors; and,
- means for processing the reflected detected pulses.

9. The apparatus of claim 8 wherein a line interconnects each sensor with its associated delay means and is deliberately mismatched to the sensor.

10. A pulse reflectometry fluid quantity gaging system, comprising:
- a plurality of transmission line sensors;
- a single means for generating electrical pulses;
- a separate delay means to provide time separation of the outputs from each of said probes and connecting each sensor except one to the means for generating electrical pulses, the one sensor being connected directly to the means for generating electrical pulses;
- means for detecting the pulses reflected from the sensors; and,
- means for processing the reflected detected pulses.

* * * * *